(No Model.)
E. R. GILL.
WATER SPRINKLER.
No. 564,610.  Patented July 28, 1896.
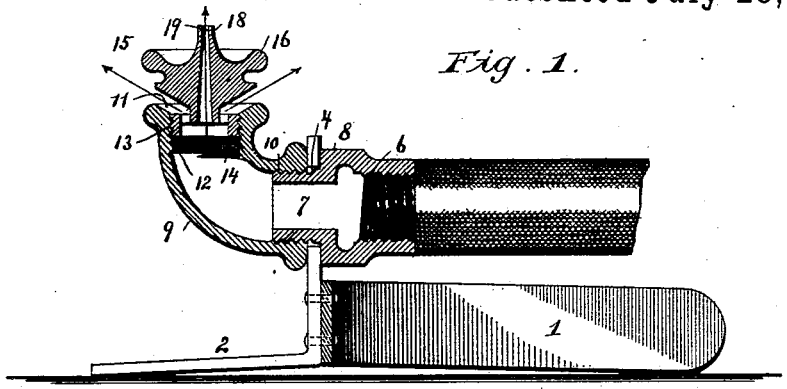
Fig. 1.
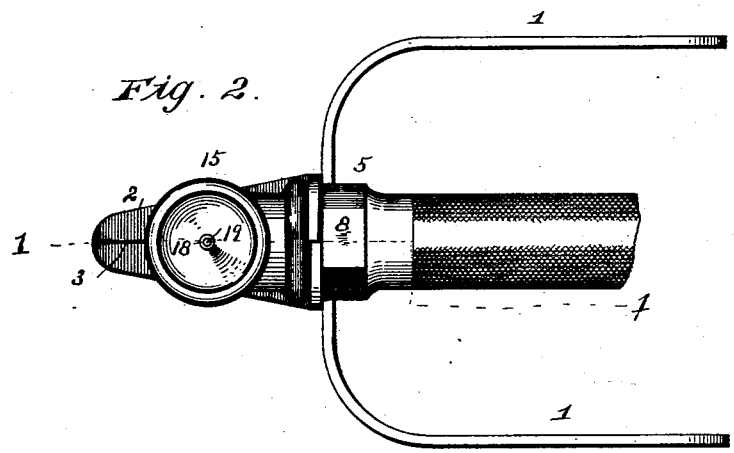
Fig. 2.
Fig. 4.
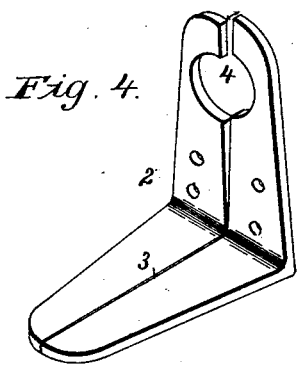
Fig. 3.
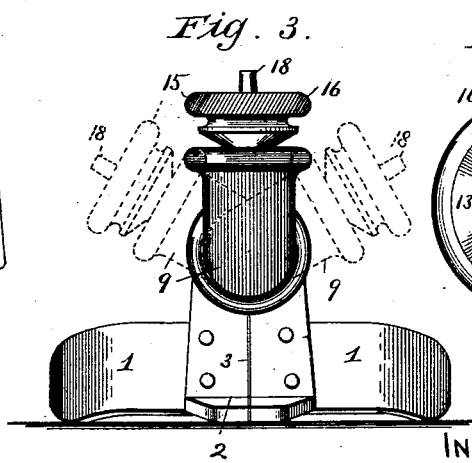
Fig. 5.
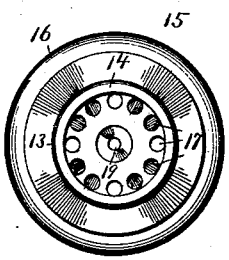
WITNESSES:
F. G. Fischer
Ben S. Strother
INVENTOR:
E. R. Gill

UNITED STATES PATENT OFFICE.

EDWIN R. GILL, OF INDEPENDENCE, MISSOURI.

WATER-SPRINKLER.

SPECIFICATION forming part of Letters Patent No. 564,610, dated July 28, 1896.

Application filed January 13, 1896. Serial No. 575,343. (No model.)

*To all whom it may concern:*

Be it known that I, EDWIN R. GILL, a citizen of the United States, residing at Independence, in the county of Jackson and State of Missouri, have invented certain new and useful Improvements in Water-Sprinklers, of which the following is a specification, reference being had therein to the accompanying drawings.

My invention relates to improvements in water-sprinklers, and is so arranged that it may be readily connected to a hose for lawn-sprinkling and other purposes to which a device of this nature may be applied; and it may be said to consist in the novel arrangement and combination of parts whereby it may be regulated to discharge the water or other liquid in a solid sheet or in the form of mist.

A further object is to provide the sprinkler with a detachable shoe or support, in order that it may be located on any portion of the lawn without requiring special care from the attendant, or may be removed from the said support and used in the ordinary manner. The device could also be employed to advantage by connecting it to an automatic fire-extinguisher, owing to the large amount of space the liquid covers when discharged from the nozzle.

Referring now to the drawings which illustrate the invention, Figure 1 is a vertical section of the device in position, taken on line 1 1 of Fig. 2. Fig. 2 is a plan elevation of same. Fig. 3 is a front elevation showing the adjustment of the elbow by dotted lines. Fig. 4 is a detail perspective view of the front portion of the shoe. Fig. 5 is an enlarged inverted plan view of the regulating-valve.

In constructing my invention I employ a supporting-shoe which consists of an approximately U-shaped rear portion 1 and an angular front portion 2, which is centrally slotted at 3. Said vertical portion is also provided with a circular opening 4 to receive a coupling 5, having internal threads 6 at its rear end to receive the threaded front end of the hose. The front end 7 of the coupling is externally threaded, and its exterior central portion 8 is polygonal in form, so that it may be operated with a wrench, or by hand, in attaching and detaching the sprinkler from its shoe.

9 indicates an elbow which is provided with internal threads 10 at its horizontal portion to engage the externally-threaded portion of the coupler. The upper internal part of said elbow has a beveled valve-seat 11 and screw-threads 12, which are engaged by the external threads 13, formed on the stem 14 of a conical valve 15. This valve is provided at its upper end with an enlarged circular head 16, that may be grasped with the hand when it is desired to adjust the valve, in order to regulate the flow of water. The under portion of valve-stem 14 is made hollow and its upper surface provided with orifices 17, arranged in a circular manner thereon to form exits beneath the conical portion of the valve for the discharge of the water. The upper central portion of the valve extends above its circular head and terminates in a jet 18, from which the water is discharged through a conical bore 19, that communicates with the hollow portion of the stem. By forming the valve and its seat in the manner above specified, the water is discharged obliquely from the nozzle, and said discharge may be varied from the finest mist to a continuous sheet by simply adjusting the valve in or out from its seat.

By referring to Figs. 3 and 4 of the drawings it will be seen that the vertical portions of sections 2 are slightly bent in opposite directions to form flat springs, so that when the front end of the coupling is passed through opening 4 and the elbow screwed up thereon one of said sections will impinge against the shoulder of the coupling, while the other bears against the face of the elbow, thus creating a friction between the two, which will prevent their accidental turning after the elbow has been properly adjusted. This desirable feature permits the turning of the elbow by hand, so that its nozzle end can be maintained in a vertical position when the device is located upon a sloping portion of the lawn, or turned to either side at any desired angle when the shoe is at its normal position, as shown by dotted lines in Fig. 3.

From the above description it will be understood that I have constructed an adjustable direct-pressure sprinkler which possesses desirable features over similar devices in point of efficiency and cheapness.

Having thus described my invention, what I claim, and desire to secure by Letters Patent, is—

1. A water-sprinkler, consisting of a coupling provided at its rear end with internal threads for connecting the hose, an exterior central portion of polygonal form, and an externally-threaded front end; and an adjustable elbow internally threaded at its opposite ends and provided with a beveled valve-seat at its nozzle end; and an adjustable conical valve terminating at its lower end in an externally-threaded hollow stem, which engages the threads of the nozzle, orifices in the upper surface of said stem, and a circular head by means of which the valve is controlled, substantially as set forth and described.

2. A water-sprinkler, consisting of an adjustable elbow, threaded at its opposite ends, and provided with a beveled valve-seat at its nozzle end; a conical valve having a threaded hollow stem adjustably mounted in said nozzle end; a shoe provided with an angular front portion, the vertical part of which has an opening; and a coupling the threaded front portion of which passes through said opening, and engages the threaded end of the elbow, thereby securing the sprinkler to the shoe, substantially as set forth and described.

3. A water-sprinkler, comprising an adjustable elbow threaded at each end, and provided with a beveled valve-seat at its nozzle end; a conical valve having a threaded circular stem adjustably located in said nozzle end; a shoe approximately U-shaped, and provided with an angular front portion consisting of two sections with an opening in their vertical portion; and a coupling adapted to be secured at its rear end to a hose, its threaded front end is passed through said opening in the shoe and engages the threaded lower end of the elbow, substantially as set forth.

4. In a water-sprinkler, a supporting-shoe comprising an approximately U-shaped rear portion, and an angular front portion, the vertical part of which is slotted and provided with an opening to receive the sprinkler, which is adjustably held therein by the two sections formed by the slot, substantially as set forth.

5. In a water-sprinkler, a supporting-shoe, provided with a vertical portion consisting of two sections having an opening near their upper portions to receive the sprinkler, said sections being oppositely bent at their upper ends to create friction between the nozzle-carrying portion of the sprinkler, and one of its adjacent parts, whereby said nozzle portion is secured from accidental turning, after receiving its proper adjustment, substantially as set forth.

In testimony whereof I affix my signature in presence of two witnesses.

EDWIN R. GILL.

Witnesses:
F. G. FISCHER,
G. Y. THORPE.